United States Patent [19]
Chau et al.

[11] Patent Number: 5,651,920
[45] Date of Patent: Jul. 29, 1997

[54] SMALL-SIZED LANTHANUM CERIUM TERBIUM PHOSPHATE PHOSPHORS AND METHOD OF MAKING

[75] Inventors: Chung-Nin Chau, Sayre; Jenace Ann Yurchisin, Athens, both of Pa.

[73] Assignee: Osram Sylvania Inc., Danvers, Mass.

[21] Appl. No.: 717,334

[22] Filed: Sep. 20, 1996

[51] Int. Cl.$^6$ .................................................. C09K 11/81
[52] U.S. Cl. ........................... 252/301.4 P; 252/301.4 R
[58] Field of Search ....................... 252/301.4 P, 301.4 R

[56] References Cited

U.S. PATENT DOCUMENTS

| | | | |
|---|---|---|---|
| 5,091,110 | 2/1992 | Fan et al. | 252/301.4 P |
| 5,106,532 | 4/1992 | Chau | 252/301.4 P |
| 5,132,042 | 7/1992 | Chau et al. | 252/301.4 P |
| 5,314,641 | 5/1994 | Collin et al. | 252/301.4 P |
| 5,340,556 | 8/1994 | Collin et al. | 423/263 |

*Primary Examiner*—Melissa Bonner
*Attorney, Agent, or Firm*—Robert F. Clark

[57] ABSTRACT

Small-sized, high brightness (La,Ce,Tb) PO$_4$ phosphors having an average particle size of less than about 4.0 microns can be made by adding boric acid and lithium carbonate to the rare earth phosphate co-precipitate prior to firing. The small-sized, high brightness phosphors have a brightness equivalent to or greater than larger-sized phosphors of the same composition.

14 Claims, 1 Drawing Sheet

SMALL-SIZED LANTHANUM CERIUM TERBIUM PHOSPHATE PHOSPHORS AND METHOD OF MAKING

TECHNICAL FIELD

This invention relates to lanthanum cerium terbium phosphate phosphors. More particularly, this invention relates to small-sized lanthanum cerium terbium phosphate phosphors and methods for making them.

BACKGROUND ART

Lanthanum cerium terbium phosphate (LAP) phosphors can be described by the general formula $(La_x, Ce_y, Tb_z)PO_4$ where x is from about 0.73 to about 0.37, y is from about 0.17 to about 0.45 and z is from about 0.10 to about 0.18. Examples of these phosphors can be found in U.S. Pat. Nos. 5,106,532 and 5,132,042 which are incorporated herein by reference. LAP phosphors are green-emitting when stimulated by ultra-violet (UV) radiation which makes them useful in the manufacture of certain fluorescent lamps especially energy efficient lamps (>75 lumens/watt) and high CRI (>70) lamps. Typically, the green-emitting LAP phosphors are blended with other materials such as alumina or other phosphors and coated onto the interior surface of fluorescent lamps using conventional coating techniques. As a general principle in fluorescent lamp manufacturing, the particle size of a phosphor affects the amount of coating needed to produce an optimal coating for a particular application. Phosphors having smaller particle sizes can provide equivalent coverage densities at lower powder weights than larger sized phosphors. Such lower powder weights reduce the manufacturing cost of the lamp.

However, a reduction in the size of a phosphor usually results in lower emission brightness because of the higher intrinsic reflection coefficient associated with the smaller particles. Additionally, because it is difficult to control the phosphor particle size during synthesis, the general practice of making a smaller sized phosphor involves milling the phosphor after synthesis. The milling process results in a further loss in brightness. Thus, the loss of brightness from the combination of milling and smaller particle size generally neutralizes the economic advantage of reducing the phosphor particle size.

Thus, it would be a significant advantage to produce a smaller size LAP phosphor without the concomitant loss in brightness.

SUMMARY OF THE INVENTION

It is an object of the invention to obviate the disadvantages of the prior art.

It is a further object of this invention to reduce the particle size of LAP phosphors without a loss in brightness.

It is still a further object of this invention to provide a method for making a LAP phosphor having an average particle size of less than about 4.0 microns without milling the phosphor.

In accordance with one aspect the invention, a phosphor is provided having the general formula $(La_x, Ce_y, Tb_z)PO_4$ where x is from about 0.73 to about 0.37, y is from about 0.17 to about 0.45 and z is from about 0.10 to about 0.18, said phosphor having an average particle size of less than about 4.0 microns and a brightness at least as great as a second phosphor having the same composition and an average particle size of greater than about 4.5 microns.

In accordance with another aspect of the invention, a method is provided for making a phosphor having the general formula $(La_x, Ce_y, Tb_z)PO_4$ where x is from about 0.73 to about 0.37, y is from about 0.17 to about 0.45 and z is from about 0.10 to about 0.18, and an average particle size of less than about 4.0 microns, comprising:

combining amounts of a $(La_x, Ce_y, Tb_z)PO_4$, boric acid and lithium carbonate to form a mixture and firing the mixture at a temperature and for a time sufficient to form the phosphor.

PREFERRED EMBODIMENTS

Figure 1:
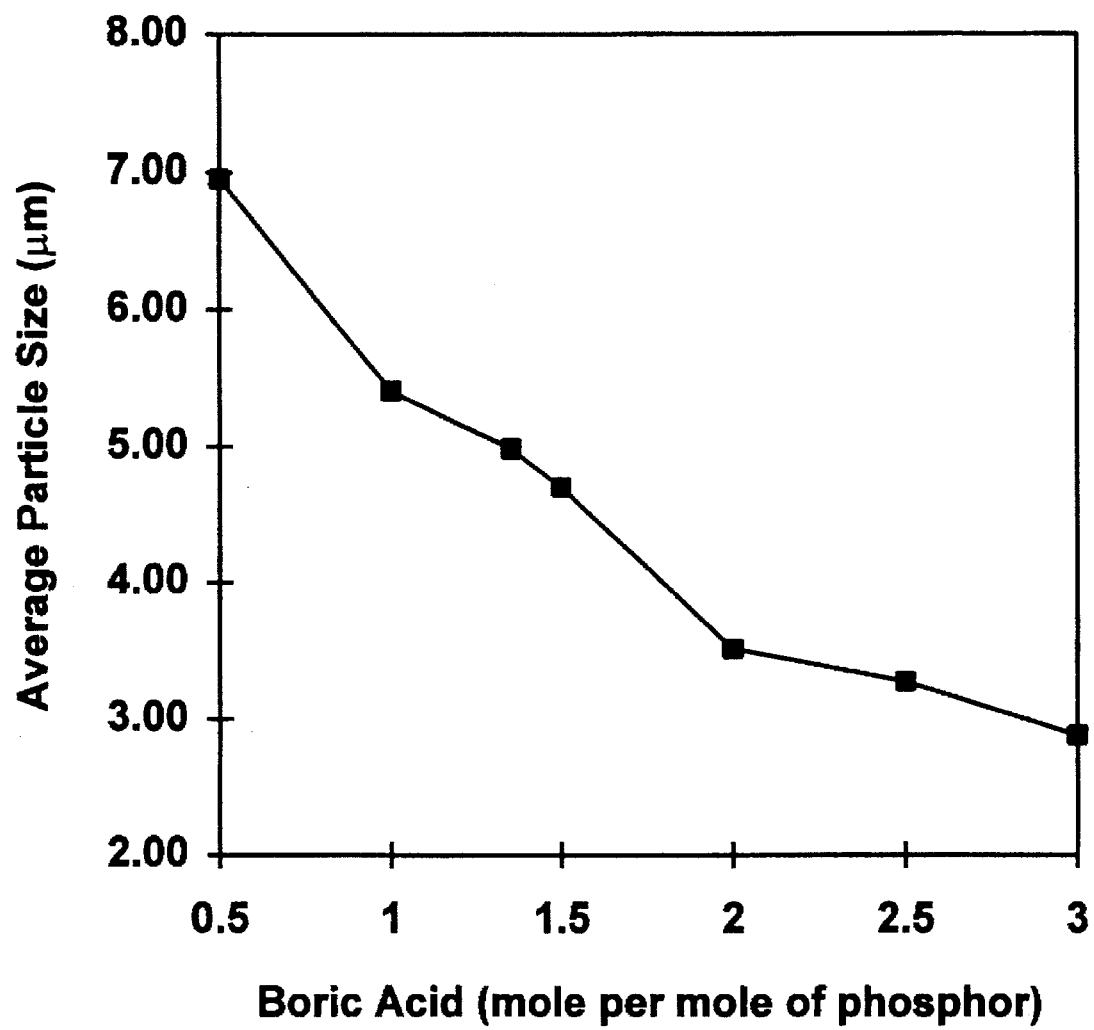
FIG. 1 is a graphical illustration showing the effect of the use of boric acid during synthesis on the average particle size of the resultant phosphor.

For a better understanding of the present invention, together with other and further objects, advantages and capabilities thereof, reference is made to the following disclosure and appended claims taken in conjunction with the above described drawing.

Typically, LAP phosphors have an average particle size of greater than about 4.5 microns (µm). (As used herein, average particle size refers to the 50% particle size as determined by Coulter Counter.) Milling LAP phosphors in order to achieve smaller particle sizes results in a loss in brightness. For example, when milling is used to reduce the average particle size of a LAP phosphor from 7.4 to 6.5 µm, the phosphor exhibits a 4% loss in brightness.

We have found that a high brightness, small-sized, green-emitting LAP phosphor can been prepared using a synthesis process which does not require milling. The phosphor produced by the method of this invention is at least as bright as the standard commercial phosphor, has substantially the same x,y color coordinates and has an average particle size of less than about 4.0 µm, and preferably less than about 3.0 µm. The high brightness, small-sized phosphor is made using boric acid and lithium carbonate during synthesis. More particularly, the phosphor is made by firing a (La, Ce, Tb)PO_4 co-precipitate with boric acid, $H_3BO_3$, and lithium carbonate, $Li_2CO_3$ at about 1200° C. in a reducing atmosphere, preferably 5–8% $H_2/N_2$ (5–8% hydrogen, balance nitrogen). The concentration of boric acid is adjusted to control the particle growth of the phosphor. Lithium carbonate is added to enhance brightness. The effective use of boric acid as an anti-flux reagent is unusual since the use of boric acid in solid state synthesis is generally known to increase particle growth. In this invention, the LAP phosphor particle size decreases with increased boric acid concentrations.

The following non-limiting examples are presented.

The rare earth phosphate co-precipitate $(La_x, Ce_y, Tb_z)PO_4$ can be made by adding ammonium phosphate or phosphoric acid to the corresponding rare earth nitrate solution. Examples of methods for making the rare earth phosphate co-precipitate can be found in U.S. Pat. Nos. 5,091,110, 5,340,556, and 5,314,641 which are incorporated herein by reference. The rare earth phosphate co-precipitate is also commercially available from Rhone-Poulenc Chemie. The general formula for the rare earth phosphate co-precipitate used in these examples was $(La_{0.45}Ce_{0.42}Tb_{0.13})PO_4$. However, other formulations with different rare earth proportions may be used.

Each example in Table 1 was prepared by blending $(La_{0.45}Ce_{0.42}Tb_{0.13})PO_4$ with varying amounts of boric acid and lithium carbonate and firing the mixture in a reducing atmosphere of 5–8% $H_2/N_2$ at about 1200° C. for about 4 hours. The fired cake was washed in 5% nitric acid for an hour during which time the cake disintegrated into a powder. The white powder was washed in water until a pH of about 6 was reached (or the conductivity of the rinse water was less than about 20 micromhos). The phosphor was then washed a 5% base solution (e.g., KOH or $NH_4OH$) for about 20 minutes and then washed again with water until the conductivity of the rinse water was less than about 20 micromhos. The washed phosphor was dried in a drying oven and then screened(−378 mesh). The relative proportions of the reagents used in each example are given in Table 1 in terms of mole per mole of phosphor (mpm). The average particle size for each material was measured by Coulter Counter. The relative brightness and CIE x,y color coordinates are also given. Brightness was measured relative a standard control sample having the same composition and x,y color coordinates, and an average particle size of 4.5 microns. Brightness measurements were made on an OMA spectroradiometer.

TABLE 1

| Example | (La, Ce, Tb)$PO_4$ (mpm) | $H_3BO_3$ (mpm) | $Li_2CO_3$ (mpm) | ave. size (μm) | Relative Brightness (%) | Color (x/y) |
|---|---|---|---|---|---|---|
| 1-1 | 1 | — | — | 4.54 | 100.9 | 0.345/0.578 |
| 1-2 | 1 | — | 0.003 | 5.02 | 102.5 | 0.345/0.578 |
| 1-3 | 1 | — | 0.010 | 6.70 | 100.8 | 0.345/0.578 |
| 2 | 1 | 0.5 | 0.030 | 6.95 | 105.2 | 0.345/0.578 |
| 3 | 1 | 1.0 | 0.030 | 5.40 | 105.1 | 0.345/0.578 |
| 4-1 | 1 | 1.35 | 0.021 | 4.79 | 103.6 | 0.345/0.578 |
| 4-2 | 1 | 1.35 | 0.029 | 4.98 | 104.6 | 0.345/0.578 |
| 4-3 | 1 | 1.35 | 0.037 | 5.17 | 105.4 | 0.345/0.578 |
| 5 | 1 | 1.5 | 0.030 | 4.69 | 104.9 | 0.345/0.578 |
| 6 | 1 | 2.0 | 0.030 | 3.51 | 105.6 | 0.345/0.578 |
| 7 | 1 | 2.5 | 0.030 | 3.27 | 104.9 | 0.345/0.578 |
| 8 | 1 | 3.0 | 0.030 | 2.88 | 104.0 | 0.345/0.578 |

The examples in Table 1 show that at constant lithium carbonate concentrations the average particle size of the resultant LAP phosphor decreases as the concentration of boric acid used in the synthesis increases. FIG. 1 graphically shows the variation in the average particle size with the concentration of boric acid at a constant lithium carbonate concentration of 0.030 mpm. Referring to FIG. 1, a boric acid concentration of greater than about 1.75 mpm yields a phosphor having an average particle size of less than about 4.0 μm and a boric acid concentration of greater than about 2.75 mpm yields and average particle size of less than about 3.0 μm.

The addition of lithium carbonate is shown to affect both the brightness and particle size of the resultant phosphor. The results in Table 1 further demonstrate that the phosphors having an average particle size of less than about 4.0 μm (Examples 6, 7 and 8) are at least as bright as the larger size phosphor made without boric acid and lithium carbonate (Example 1-1). In fact, Examples 6,7 and 8 show an increase in brightness of about 3 to 5% over Example 1-1. Furthermore, the addition of boric acid and lithium carbonate does not shift the color coordinates of the phosphor. Thus, there is no loss in LAP phosphor performance when the particle size is reduced by adding boric acid and lithium carbonate during synthesis.

While there has been shown and described what are at the present considered the preferred embodiments of the invention, it will be obvious to those skilled in the art that various changes and modifications may be made therein without departing from the scope of the invention as defined by the appended claims.

We claim:

1. A phosphor having the general formula ($La_x$, $Ce_y$, $Tb_z$)$PO_4$ where x is from about 0.73 to about 0.37, y is from about 0.17 to about 0.45 and z is from about 0.10 to about 0.18, said phosphor having an average particle size of less than about 4.0 microns and a brightness at least as great as a second phosphor having the same composition and an average particle size of greater than about 4.5 microns.

2. The phosphor of claim 1 wherein the average particle size of the phosphor is less than about 3.0 microns.

3. The phosphor of claim 1 wherein the phosphor has substantially the same x,y color coordinates as the second phosphor.

4. A method for making a phosphor having the general formula ($La_x$, $Ce_y$, $Tb_z$)$PO_4$ where x is from about 0.73 to about 0.37, y is from about 0.17 to about 0.45 and z is from about 0.10 to about 0.18, and an average particle size of less than about 4.0 microns, comprising:

combining amounts of a ($La_x$, $Ce_y$, $Tb_z$)$PO_4$, boric acid and lithium carbonate to form a mixture and firing the mixture at a temperature, and for a time, sufficient to form the phosphor.

5. The method of claim 4 wherein the mixture is fired in a reducing atmosphere.

6. The method of claim 5 wherein the reducing atmosphere is 5–8% $H_2/N_2$.

7. The method of claim 4 wherein the average particle size of the phosphor is less than about 3.0 microns.

8. The method of claim 4 wherein the amount of boric acid is greater than about 1.75 moles per mole of phosphor.

9. The method of claim 7 wherein the amount of boric acid is greater than about 2.75 moles per mole of phosphor.

10. The method of claim 4 wherein the mixture is fired at about 1200° C. for about 4 hours.

11. The method of claim 4 further comprising the steps of:

washing the phosphor in nitric acid, rinsing the phosphor with water, washing the phosphor with a solution of a base, rinsing the phosphor with water, drying the phosphor and screening the phosphor.

12. A phosphor having the general formula ($La_x$, $Ce_y$, $Tb_z$)$PO_4$ where x is from about 0.73 to about 0.37, y is from about 0.17 to about 0.45 and z is from about 0.10 to about 0.18, said phosphor having an average particle size of less than about 4.0 microns and a brightness at least as great as a second phosphor having the same composition and an average particle size of greater than about 4.5 microns, the phosphor being made by the steps comprising:

combining amounts of a $(La_x, Ce_y, Tb_z)PO_4$, boric acid and lithium carbonate to form a mixture and firing the mixture at about 1200° C. for about 4 hours in a reducing atmosphere to form the phosphor.

13. The phosphor of claim 12 wherein the phosphor is subjected to the additional steps of:

washing the phosphor in nitric acid, rinsing the phosphor with water, washing the phosphor with a solution of a base, rinsing the phosphor with water, drying the phosphor and screening the phosphor.

14. The phosphor of claim 12 wherein the phosphor has an average particle size of less than about 3.0 microns.